United States Patent [19]

Pollart et al.

[11] Patent Number: 4,943,456

[45] Date of Patent: Jul. 24, 1990

[54] MICROWAVE REACTIVE HEATER

[75] Inventors: Kenneth A. Pollart; Terrence P. Lafferty, both of Neenah, Wis.

[73] Assignee: James River Corporation of Virginia, Richmond, Va.

[21] Appl. No.: 400,579

[22] Filed: Aug. 30, 1989

Related U.S. Application Data

[63] Continuation-in-part of Ser. No. 239,544, Sep. 1, 1988.

[51] Int. Cl.⁵ .................. H05B 6/64; B65D 81/34
[52] U.S. Cl. ............................. 428/34.3; 428/34.2;
428/425.1; 428/458; 428/461; 428/464;
428/511; 428/537.5; 219/10.55 E; 426/107;
426/234
[58] Field of Search ................ 428/34.2, 34.3, 328,
428/408, 425.1, 496, 511, 702, 458, 461, 464,
537.5; 426/107, 234, 243; 219/10.55 E;
156/290, 291, 277, 384

[56] References Cited

U.S. PATENT DOCUMENTS

| | | | |
|---|---|---|---|
| 4,190,757 | 2/1980 | Turpin et al. | 219/10.55 E |
| 4,518,651 | 5/1985 | Wolfe, Jr. | 428/308.8 |
| 4,865,921 | 9/1989 | Hollenberg et al. | 428/461 |
| 4,876,423 | 10/1989 | Tighe et al. | 219/10.55 E |
| 4,876,427 | 10/1989 | Mode | 219/10.55 E |
| 4,883,936 | 11/1989 | Maynard et al. | 219/10.55 E |

Primary Examiner—George F. Lesmes
Assistant Examiner—Christopher Beam
Attorney, Agent, or Firm—William A. Aguele; Richard J. Gallagher; Thomas H. Whaley

[57] ABSTRACT

Microwave responsive heaters and packages for food products and the like containing the heaters are disclosed in which the heaters consist of a microwave reactive coating composition on a heat stable substrate which is pattern bonded to a surface to be heated by microwave radiation.

6 Claims, 1 Drawing Sheet

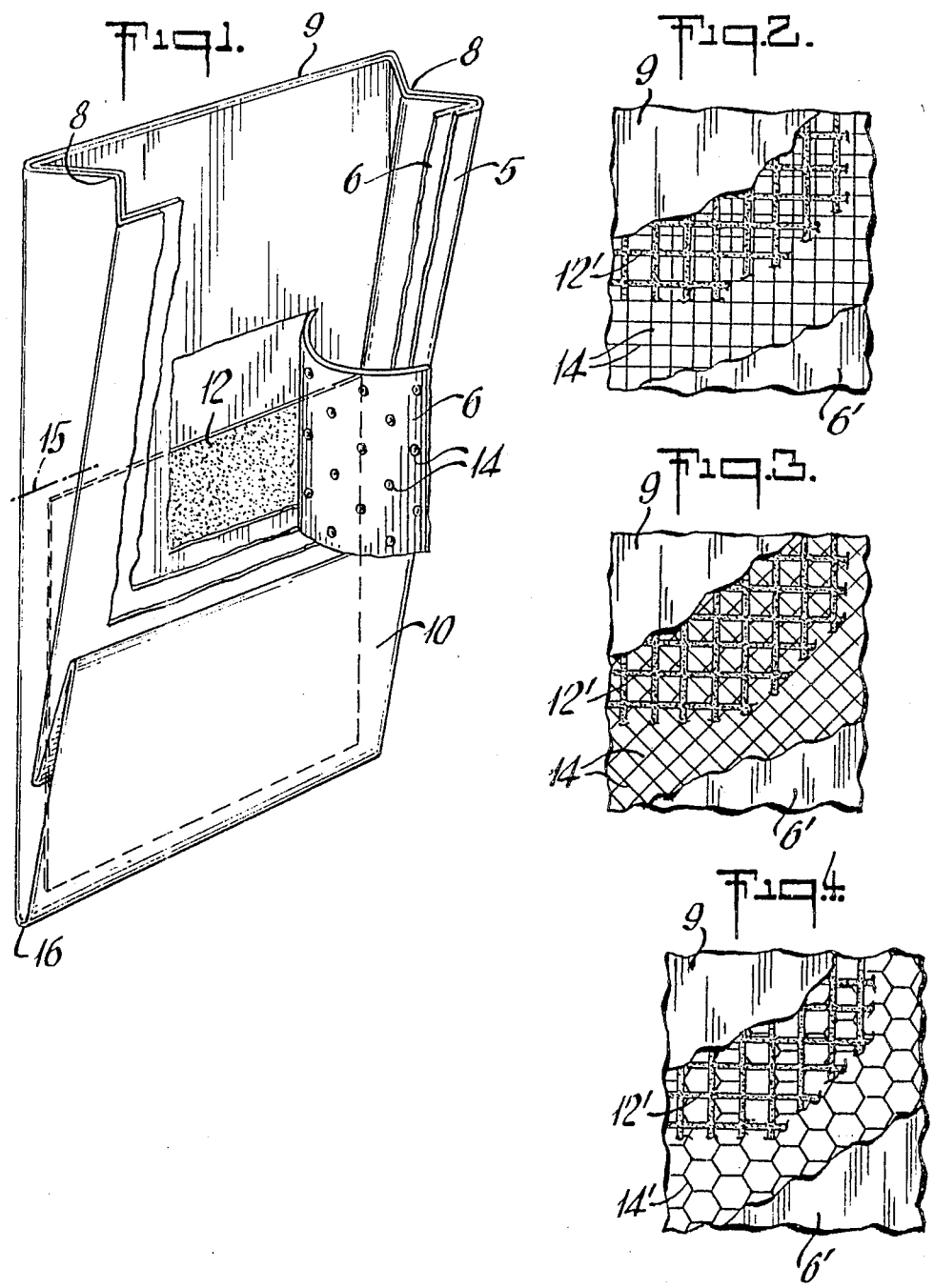

MICROWAVE REACTIVE HEATER

This application is a continuation-in-part of our copending U.S. patent application Ser. No. 07/239,544, filed Sept. 1, 1988.

This invention relates to a microwave responsive heater suitable for use in various food packages and the like in which the contents may be heated by microwave radiation. In one of its more specific aspects, this invention relates to a package for raw, cooked, or partially cooked foods which may include also shortening, e.g. oil, hydrogenated oil, butter or margarine, animal fat, and the like. In another of its more specific aspects, this invention relates to a package for corn kernels and oil or shortening which includes a microwave responsive heating element. In a preferred embodiment of this invention, the heater is part of a composite package comprising an inner liner or bag and a paper outer container or bag including a microwave responsive heating element disposed between the two parts of the package. The heating element may comprise a microwave reactive coating composition on the outer surface of the inner bag or liner, on the inner surface of the outer bag or container, or on a separate substrate held in place by an adhesive composition.

Numerous containers, including paper or plastic boxes and bags, have been devised for use as packages for foods which are suitable also as utensils for heating or cooking the food in a microwave oven. Many such containers are referred to in European Patent Application Publication Number 256,791, incorporated herein by reference. Some of the prior art containers comprise a heating element which is responsive to microwave radiation to produce a more highly elevated temperature in one or more selected areas of the container than that in the rest of the container. One type of heating element comprises metal particles, usually aluminum, vacuum deposited on a polyester film; the metallized film is then laminated onto paper or paperboard forming the container. The thus metallized paper or paperboard can then be used in a microwave oven to heat, brown or sear food items placed on the metallized paperboard or in packages comprising metallized paper or paperboard. While such structures can be very effective as heaters, the vacuum deposition process does not readily lend itself to coating selected areas of the film or the application of varying amounts of metal particles or metallized coating to selected areas of the finished package, carton or structure.

Other methods of forming microwave responsive heating elements involve dispersing particles which are microwave energy absorbers, e.g. carbon, metals, and metal alloys, in a binder and forming a sheet or laminate comprising the dispersed particles. Turpin, U.S. Pat. No. 4,190,757 discloses heaters which comprise a layer of particulate lossy materials, e.g. carbon, iron and various metal oxides, or alloys, in an inorganic binder, e.g. sodium silicate. U.S. Pat. No. 4,264,668 to Balla discloses a heating element made up of a layer of carbon black in an acrylate binder laminated between a carrier layer, e.g. paper, cardboard or plastic material, and an outer layer of thermoplastic material. European Patent Application Publication No. 242,952 discloses a heating element made up of a metal or metal alloy in flake form in a thermoplastic dielectric matrix on a dielectric substrate.

In our commonly assigned copending U.S. patent application Ser. No. 07/239,544 we disclose microwave reactive heating elements comprising a microwave reactive coating composition which may be applied directly to a food package, suitably by rotogravure printing methods. We have now discovered, unexpectedly, that the performance of coated or printed heaters disclosed in our earlier patent application are improved by pattern bonding the heater to the surface which is to be heated. Pattern bonding, as opposed to lamination or entire surface bonding, results in improved temperature response and heat distribution as demonstrated in the examples of this application.

The present invention also provides an improved food package incorporating a heating element comprising a microwave interactive composition coated or printed on paper, polyester or paperboard and forming an integral part of the package.

In one preferred embodiment of the present invention, a multi-layered bag comprising an inner bag or liner of greaseproof paper or polyester film and an outer bag of paper comprises an integral microwave heating element printed on the outer surface of the inner bag or on the inner surface of the outer bag wherein the two bags are joined to one another with a heat stable adhesive applied in a pattern covering only a part of the heater area. The microwave heating element is made up of a microwave reactive coating applied directly, suitably by a conventional coating or printing process, onto a selected area of the surface of the inner or outer bag or onto a separate substrate, preferably of paper or polyester sheet. In a preferred embodiment of the invention, the microwave reactive coating is applied to the inner surface of the outer bag or container. Alternatively, the microwave reactive coating may be applied directly to the outer surface of the inner or outer bag or container. In either event, the two bags are securely attached to one another in the area comprising the heater by a pattern of adhesive.

Illustrative embodiments of this invention as applied to bag type containers are shown in the accompanying drawings.

FIG. 1 is a perspective view of an empty bag illustrating a preferred embodiment of this invention with portions cut away to show its interior construction and a solid patch printed microwave heater element.

FIG. 2 is an illustration of a preferred form of heater element having a grid pattern printed heater and a grid pattern adhesive.

FIG. 3 is an illustration of an alternate adhesive bonding pattern forming a part of a printed microwave reactive heater element as employed in the microwavable food containers of this invention.

FIG. 4 is an illustration of another pattern of adhesive bonding of the printed heating elements of this invention.

With reference to FIG. 1 of the drawings, an empty food container in the form of a double walled bag comprising a heater structure of our invention is illustrated. The container, suitable as a popcorn bag, comprises an outer paper bag 5 and an inner greaseproof bag or liner 6. The inner liner may be of polyester or greaseproof paper. The illustrated bag is provided with gussetted side panels 8 which extend from the top of the bag 9 to a conventional bottom section 10.

In this embodiment of our invention a solid heater element 12 is printed on the inner surface of the paper outer bag 5 and laminated to the outer surface of the inner bag 6 by spot bonding with an adhesive in a polka-dot pattern 14 as illustrated in FIG. 1. When loaded with a food product, for example, popcorn kernels and solidified oil, the load normally is placed in the mid section of the bag between fold lines 15 and 16 adjacent the heater 12.

FIG. 2 illustrates another embodiment of this invention in which the heater element 12' is in the form of a grid in which the printed area coverage is in the range of from about 40 percent to about 75 percent of the area of the heater; suitably about 50 percent of the area is covered by the overall print pattern. As a specific illustration, grid pattern lines approximately 1.8 mm wide with 4.5 mm square openings have been found entirely satisfactory as heaters, the print in this case covering approximately 50% of the total heater area. In the embodiment of FIG. 2, the heater 12' is laminated to the surface 6' to be heated by a grid pattern 14 of adhesive. An adhesive grid pattern printed with lines of adhesive approximately 0.7 mm in width and spaced about 3 mm apart has been found effective for this purpose. The adhesive in the pattern preferably contacts 5 to 50 percent of the area of the heater.

FIG. 3 illustrates a grid pattern heating element 12' in combination with a grid pattern adhesive 14 wherein the adhesive pattern is skewed relative to the heater pattern.

FIG. 4 illustrates an alternate embodiment of the heater grid and adhesive patterns of FIGS. 2 and 3 wherein the patterns are dissimilar, for example, with the heater pattern as a grid and the adhesive pattern as a honeycomb.

While we have shown in the figures, representative illustrative embodiments of microwave food packages including the heater construction of this invention, our invention is not limited to the specific structures illustrated and described herein. For example, the heating element need not necessarily be applied directly to one of the surfaces of the container itself but may be applied to a suitable substrate of paper, polyester, or the like and then inserted into the package between the inner and outer layers of the package or be attached to the inner or outer surface of the container. As another example, not illustrated, the heating element may be contained in or printed on the bottom 10 of a bag of the type illustrated in FIG. 1. In a similar manner, the patterns illustrated in FIGS. 2 to 4 may be reversed; for example, in FIG. 4 the heater pattern may be a honeycomb and the adhesive either polkadot as in FIG. 1 or grid as in FIG. 2. Numerous other combinations and constructions are permissible without departing from the scope of our invention. For example, the polkadot adhesive pattern may be employed with the grid pattern heater.

As one specific example, a preferred heater for a popcorn bag as illustrated in FIG. 1 which is designed to contain about 70 grams of corn kernels having a popped volume of 2500 cubic centimeters may be in the form of a square or rectangle with a total area of about 25 to 35 square inches (about 160 to 225 square centimeters) with the heater printed in the form of a grid pattern as illustrated in FIG. 2 at a coating weight in the range of from about 1.0 to about 4 pounds per 3000 sq. ft. ream. Alternatively, the heater coating composition may be in the form of a solid patch coating as illustrated in FIG. 1 with an equivalent coating weight. The grid type heaters are the subject matter of a coassigned, copending patent application of Richard R. Hartman, et al, Ser. No. 07/368,568, filed June 20, 1989. As indicated therein, a greater heat and temperature response to microwave energy radiation is produced with a grid pattern than with a solid patch coating of the same coating weight per total heater area.

As disclosed in our commonly assigned copending patent application, Ser. No. 07/239,544, the preferred coating compositions are composed of carbon black, finely divided flake aluminum, clay, and a synthetic resin binder in a suitable carrier vehicle. Preferred binders include aqueous or non-aqueous solutions or dispersions of a polymer precursor that serve as both and vehicle for the remaining solid components. Those binders which are suitable for use in printing inks are suitable for use as binder and vehicle for the carbon black, aluminum and clay components forming a printable composition from which the heater may be formed. Generally available latex binder formulations marketed for that purpose are preferred. While latex formulations are preferred as binders, a non-aqueous solvent formulation of a binder, for example, the product marketed by Morton Chemical Company under the trade name Morez 100, also has been found suitable for this purpose. Preferred components of the heater composition include carbon in the form of carbon black or graphite, and a finely divided metal component, e.g. aluminum, tin, bronze, nickel, and the like, which are conductive or semiconductive or ferromagnetic materials capable of converting microwave radiation energy to heat. The inert powdered solid temperature moderators suitable for use in these formulations include clays, e.g. kaolin and English china clays, alumina, alumina hydrate (aluminum hydroxide), aluminosilicates, silica, calcium carbonate, titanium dioxide, and the like. The temperature moderator should be essentially inert and substantially unresponsive or only mildly responsive to microwave radiation. Preferred binders comprise synthetic resins in a suitable vehicle; especially preferred binders include polymer latex formulations marketed for this purpose.

The relative proportions by weight of carbon to metal in the composition may be within the range of from about 1:2 to about 2:1 with a preferred ratio of carbon black to aluminum flake is about 0.6. The content of the inert temperature moderator ingredient, e.g. clay, in the composition may range from about 10 percent by weight of the total (dry basis) weight to about 35 percent.

The relative proportions of binder solids to the remaining solids making up the heater components may be in the range of from about 0.3:1 to 1:1. A binder solids content in the range of from about 30 to about 40 weight percent of the total composition weight is generally preferred. Preferably only enough binder is used to adequately bond the solid coating components to one another and to the substrate.

In a preferred embodiment, wherein the microwave reactive material is a mixture of carbon black and aluminum flake with clay as a moderator, collectively referred to as pigment, and the binder is an acrylic emulsion, the pigment to binder weight ratio should be about 2:1 or higher. The weight ratio of carbon black to aluminum flake can be varied from about 2:1 to 1:2 without having a major effect on temperature response.

Other materials can be included in the coating composition, such as surfactants, dispersion aids and other conventional additives used in coating and printing compositions to facilitate application of the coating composition to the substrate by rotogravure or other suitable printing or coating methods. The coating can be applied using conventional printing and coating processes, e.g., rotogravure, silk screen, flexography, air knife, rolls, blade, etc. After the coating composition has been applied it can be dried using conventional drying ovens normally provided in web printing and coating processes.

EXAMPLES

A composition was prepared from carbon black, finely divided aluminum flake and kaolin clay dispersed in a mixture of one part by weight Lucidene 602 and two parts Rhoplex B15 by weight based on their resin solids content which supply the binder material. The compositions contained 19 weight percent carbon black marketed under the trade name Arosperse 47 by the Huber Corporation; 35 weight percent aluminum flake marketed by Obron Corporation under the trade name Hydrolac W60; 18 weight percent Georgia Kaolin, Premier No. 1 grade; and 33 weight percent (basis resin solids) of a 1:2 mixture of Lucidene 602 and Rhoplex B15.

Microwave reactive heaters were made up by applying the microwave coating composition to 35 lb per ream white bag paper with a gravure printing press in a solid print (all over) pattern over an area of 12 cm by 14 cm. The coating was dried in a forced air convection dryer at 400° F. and laminated to a 20 lb/ream greaseproof paper using a commercial laminating adhesive marketed under the trade designation 1060-W41M by Dexter-Midland Inc. Specimens 1 to 5 were laminated with a continuous layer of adhesive applied by a Bird bar applicator extending over the entire surface of the microwave reactive coating. Specimens 6 to 10 were spot bonded with from about one to about one and one half dots (¼ to ⅜ inch diameter each) of adhesive per square inch.

The microwave reactive heater test specimens were heated in a 700 watt Litton microwave oven and the temperature response measured with a Hughes Probeye Infrared Video System. Result of the tests are shown in Table I.

TABLE I

| | Temperature Response (°F.) | | | | |
|---|---|---|---|---|---|
| Specimen | 20 sec | 1 min | 2 min | 4 min | 8 min |
| 1 | 450 | Ignited (1.5 min) | | | |
| 2 | 450 | 510 | | Ignited (7 min) | |
| 3 | 440 | Ignited (1.5 min) | | | |
| 4 | 450 | Ignited (1.5 min) | | | |
| 5 | 450 | Ignited (1.5 min) | | | |
| 6 | 365 | 425 | 400 | 400 | 400 |
| 7 | 440 | 440 | 440 | 410 | 400 |
| 8 | 440 | 440 | 440 | 430 | 430 |
| 9 | 420 | 420 | 420 | 420 | 420 |
| 10 | 440 | 440 | 440 | 430 | 430 |

The results shown in Table I clearly indicate the advantages of patterned adhesive lamination of the heater surface (specimens 6–10) to the surface to be heated.

In typical applications, such as popcorn bags, printed heaters made up with our printable microwave interactive coatings and adhesives utilizing the partial area coverage patterns, for example, the grid patterns, are capable of providing the desired level of temperature response for a given load requirement. It is therefore possible, for example, to select a pattern coating weight and adhesive pattern providing the temperature response required to yield a high volume of popped corn with a minimum number of unpopped kernels while at the same time minimizing the tendency of the heater to cause scorching of the paper bag. Pattern coatings, e.g. the heater grid pattern, covering 35 to 80 percent of the heater surface area will usually provide the desired temperature response over the entire printed area. Preferably, the area covered by the heater coating forming the pattern is within the range of 40 to 75 percent of the heater area. The adhesive in the adhesive pattern preferably covers 5 to 50 percent of the heater area, suitably about 30 to about 50 percent of the heater area.

We claim:

1. In an article having a microwave reactive heater comprising a heat stable substrate with a microwave interactive surface coating thereon comprising finely divided carbon, a finely divided microwave reactive metal, clay, and a dielectric organic solid binder, the improvement which comprises laminating with an adhesive the microwave heater surface to a surface of the article to be heated.

2. A heater as defined in claim 1 wherein the adhesive pattern extends over the entire heater surface and the adhesive covers from about 5 to about 50 percent of the area of the microwave interactive heater surface.

3. A heater as defined in claim 1 wherein the adhesive is in the form of a spot pattern.

4. A heater as defined in claim 1 wherein the adhesive is in the form of a grid pattern.

5. A heater as defined in claim 4 wherein the adhesive grid pattern extends over the entire surface of the heater and the adhesive covers from about 30 to about 50 percent of the area of the heater surface.

6. In a paper or paperboard container having a microwave reactive heater comprising a heat stable substrate with a microwave surface coating thereon comprising finely divided carbon, a finely divided microwave reactive metal, clay, and a dielectric organic solid binder, the improvement which comprises laminating the microwave heater surface to the paper or paperboard container with an adhesive in a partial area coverage pattern.

* * * * *

UNITED STATES PATENT AND TRADEMARK OFFICE
CERTIFICATE OF CORRECTION

PATENT NO. : 4,943,456

DATED : July 24, 1990

INVENTOR(S) : Kenneth A. Pollart and Terrence P. Lafferty

It is certified that error appears in the above-identified patent and that said Letters Patent is hereby corrected as shown below:

Column 4, line 9, after "both" insert --binder--.

Signed and Sealed this

Third Day of September, 1991

Attest:

HARRY F. MANBECK, JR.

Attesting Officer

Commissioner of Patents and Trademarks